UNITED STATES PATENT OFFICE 2,168,174

VAT DYESTUFFS OF THE ANTHRAQUINONE SERIES

Otto Schlichting, Ludwigshafen-on-the-Rhine, Germany, assignor to General Aniline Works, Inc., New York, N. Y., a corporation of Delaware No Drawing. Application July 7, 1937, Serial No. 152,375. In Germany July 8, 1936

1 Claim. (Cl. 260—261)

The present invention relates to vat dyestuffs of the anthraquinone series.

I have found that compounds of the anthraquinone series having the general composition:

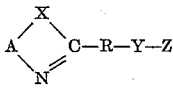

(in which A is the radicle of an anthraquinone, X is oxygen, sulphur, selenium, tellurium or an imino group, R is a radicle of the benzene series, Y is an imino group or one of the groups —CO—NH— or —NH—CO— and Z is a cyclic radicle) are valuable vat dyestuffs.

The said compounds may be prepared by causing compounds of the structure

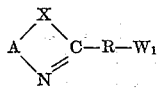

to react with compounds of the structure Z—$W_2$, $W_1$ and $W_2$ being halogen, a hydroxy, amino or cyano group or a carboxylic acid, carboxylic acid amide, carboxylic acid anhydride or carboxylic acid halide group and the initial materials be so selected that the groups $W_1$ and $W_2$ allow the radicle

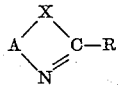

to join with the radicle Z by means of Y, or by causing compounds of the composition Z—Y—R—V in which V is one of the groups —COOH, —COHalogen, —CHO, —CH(Halogen)$_2$, —C(Halogen)$_3$ or —CONH$_2$ to react with aminoanthraquinones which allow of the attachment of an azole ring.

For example anthraquinoneazoles which contain on the carbon atom of the azole ring at least one non-hydrogenated ring incapable of vatting which contains at least one exchangeable negative radicle (as for example halogen atoms or nitro groups) may be caused to react with cyclic compounds which contain at least one exchangeable hydrogen atom attached to nitrogen (as for example primary or secondary amino derivatives of cyclic compounds), or amides of cyclic carboxylic acids may be caused to react with anthraquinoneazoles of the said kind. The compounds thus obtainable are either imino compounds or carboxylic acid amides.

The carboxylic acid amides are obtained when anthraquinoneazoles having at least one non-hydrogenated ring incapable of vating attached to the azole ring which contains an amino group with a replaceable hydrogen atom are treated with acylating agents containing a cyclic radicle Z. Furthermore anthraquinoneazoles of the said kind which contain an amino group in the ring attached to the azole ring may also be caused to react with amides of cyclic carboxylic acids in the presence of acid agents. Cyclic amino compounds having at least one replaceable hydrogen atom may also be caused to react with anthraquinoneazoles containing at least one non-hydrogenated ring incapable of vatting attached to the azole ring and in the ring a carboxyl group in a form which renders it capable of forming acid amides.

Another way of preparing the new dyestuffs consists in causing cyclic compounds containing, attached by way of an amino or carboxylic amide group, at least one non-hydrogenated ring incapable of vatting and in this ring a carboxylic, carboxylic acid amide, carboxylic acid halide, aldehyde, di- or tri-halogenmethyl group, to react with aminoanthraquinones which are capable of reacting with the said compounds with the formation of an azole ring. In this connection there may be mentioned for example aminoanthraquinones containing halogen or a hydroxy, mercapto, seleno, telluro or amino group in ortho position to the amino group. The preparation of thiazoles may also be carried out by effecting the reaction with the aminoanthraquinone while simultaneously or subsequently adding sulphur or sulphurizing agents. A similar procedure holds good for the preparation of the selenazoles. In many cases, other processes usual for the preparation of azoles may be used.

The anthraquinoneazoles described as initial materials at the commencement of the third paragraph of the description may contain the azole ring at any two adjacent positions of the anthraquinone. In addition to the groups necessary for the reaction contained in the ring situated on the azole ring, the compounds may contain any desired atoms or groups in the said ring or in the anthraquinone part of the molecule. They may be obtained by the processes usual for the preparation of anthraquinone azoles. The compounds the radicle Z of which is attached to the carbon atom of the azole ring by the bridge R—Y— may belong to the benzene, naphthalene, anthracene, pyrene, perylene, anthraquinone, anthrapyrimidine, anthanthrone, pyranthrone, dibenzpyrenequinone, naphthindenone, benzanthrone, benzanthraquinone, azanthraquinone, azabenzanthrone, anthrapyridone, pyrazolanthrone, thiazolanthrone, anthraquinonebenzacridone, anthraquinonethioxanthone series or also to the azanaphthalene, azanthracene, azaphenanthrene, azapyrene, azaperylene and carbazole series.

The reaction is usually effected by heating and preferably in the presence of a diluent. In many cases it may be promoted by the addition of catalytic substances, as for example copper and its compounds and/or by using agents binding acids.

The new vat dyestuffs thus obtainable have various shades of color depending on the initial materials. The yields are usually very good and in most cases correspond to the theoretical yields. If necessary the dyestuffs may be purified by the usual methods, as for example by crystallisation or by treatment with oxidising agents and in many cases also by way of their salts with strong acids or by vatting. They are distinguished by good fastness to light, chlorine and kier boiling.

The following examples will further illustrate how the said invention may be carried out in practice but the invention is not restricted to these examples. The parts are by weight.

*Example 1*

A mixure of 10 parts of C.4'-aminophenylanthraquinone-1(N).2-oxazole (obtained from 1-amino-2-hydroxyanthraquinone by heating with para-nitrobenzoyl chloride in nitrobenzene and reduction of the nitro group to the amino group with alkaline sodium hydrosulphite solution), 9 parts of anthraquinone-2-carboxylic acid chloride and 200 parts of nitrobenzene is heated to boiling in a stirring vessel until hydrogen chloride no longer escapes. The whole is then allowed to cool to about 100° C. and the yellow crystal pulp is filtered off by suction and washed with nitrobenzene and methanol. The dyestuff having the composition

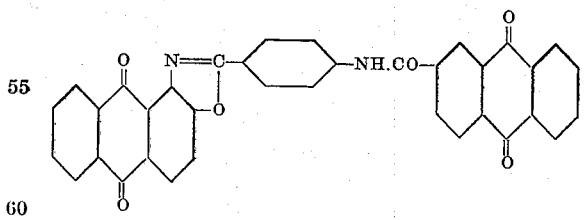

which is obtained in good yields is a yellow crystal powder which melts at above 360° C. It dyes vegetable fibres powerful greenish yellow shades of very good fastness properties from a red vat.

If 1.4-dichloranthraquinone-6-carboxylic acid chloride be used instead of anthraquinone-2-carboxylic acid chloride, a yellow dyestuff is also obtained. By exchanging the chlorine atoms of this dyestuff by amino groups or radicles of compounds containing an exchangeable hydrogen atom attached to nitrogen, valuable vat dyestuffs are likewise obtained.

*Example 2*

A mixture of 10 parts of C.4'-aminophenylanthraquinone-1(N).2-oxazole, 9 parts of 1-aminoanthraquinone-2-carboxylic acid chloride and 200 parts of nitrobenzene is heated to boiling for about an hour in a stirring vessel, cooled and the crystal pulp filtered off by suction and washed with nitrobenzene and alcohol. There is thus obtained in the calculated yield a compound having the composition:

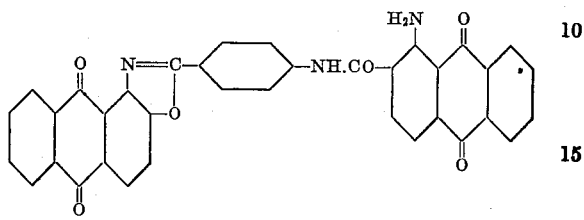

in the form of a red crystal powder. It dyes vegetable fibres fast red-orange shades from a violet-tinged red vat.

By starting from C.4'-aminophenylanthraquinone-3(N).2-oxazole, a red dyestuff having the composition:

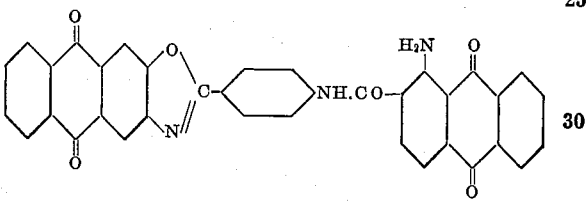

is obtained which dyes cotton scarlet-red shades from a violet-tinged red vat.

Similar dyestuffs are obtained by using 1-aminoanthraquinone-6-carboxylic acid chloride or 1-nitroanthraquinone-2-carboxylic acid chloride instead of 1-aminoanthraquinone-2-carboxylic acid chloride.

*Example 3*

A mixture of 6.5 parts of C.4'-aminophenylanthraquinone-1(N).2-oxazole, 8 parts of anthraquinone-2(S).1-thioxanthone-6'-carboxylic acid chloride and 300 parts of nitrobenzene is heated to boiling for about an hour while stirring and the yellow crystal pulp is filtered off by suction while still hot and washed with nitrobenzene and methanol. There is thus obtained in the calculated yield a dyestuff having the composition:

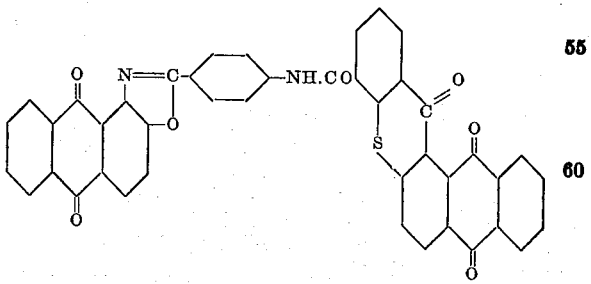

as a yellow crystal powder. It dyes vegetable fibres fast greenish yellow shades from a brown vat.

If benzanthrone-6-carboxylic acid chloride, 1(N).2-pyrazoloanthraquinone-Py-3-carboxylic acid chloride or its N-methyl derivative, Py-3-phenyl-1(N).2-pyrazoloanthraquinone carboxylic acid chlorides or monophthaloylcarbazole carboxylic acid chlorides be used instead of anthraquinonethioxanthone carboxylic acid chloride, yellow to yellow-red vat dyestuffs of good fastness properties are also obtained.

Example 4

A mixture of 10 parts of C.4'-aminophenylanthraquinone-1(N).2-oxazole, 12 parts of anthraquinone - 1(N).2.1'.2'-benzene-acridone - 5' - carboxylic acid chloride and 200 parts of nitrobenzene is heated to boiling while stirring until hydrogen chloride is no longer evolved, which is the case after about an hour. The whole is allowed to cool and the crystal pulp is filtered off by suction and washed with nitrobenzene and alcohol. A red crystal powder which does not melt even at 360° C. is obtained. It dyes cotton fast, brilliant red-yellow shades from a red-violet vat.

If C.4'-aminophenylanthraquinone-2(N).3-oxazole (obtainable for example by the reduction of C.4'-nitrophenylanthraquinone-2(N).3-oxazole (prepared from 2-amino-3-hydroxyanthraquinone by heating with para-nitrobenzoyl chloride in nitrobenzene at 200° C.) be used instead of C.4'-aminophenylanthraquinone-1(N).2-oxazole, a red dyestuff is also obtained.

Example 5

C.4' - aminophenylanthraquinone - (S) .2(N) - thiazole is first prepared by heating 1-mercapto-2-aminoanthraquinone with para-nitrobenzoyl chloride in nitrobenzene to boiling and treating the resulting C.4'-nitrophenylanthraquinone-1(S).2(N)-thiazole with sodium hydrosulphite in alkaline solution. A mixture of 10 parts of the thiazole thus obtained, 9 parts of anthraquinone-2-carboxylic acid chloride and 200 parts of nitrobenzene is heated to boiling for about an hour and then allowed to cool to about 150° C. The yellow crystal pulp is filtered off by suction and washed with nitrobenzene and methanol. The resulting dyestuff is a yellow crystal powder having the following composition:

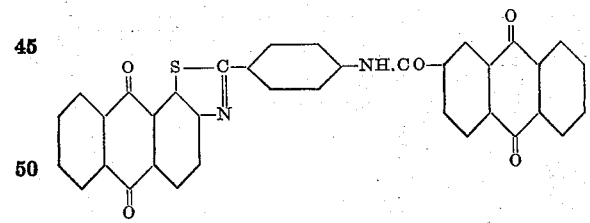

It dyes vegetable fibres powerful fast yellow shades from a violet-tinged red vat.

A similar dyestuff is obtained by heating the Schiff's base derived from 2-aminoanthraquinone and 4'-(anthraquinone-2-carbamido-)-benzaldehyde with sulphur and/or sulphur monobromide in solvents of high boiling point.

Example 6

A mixture of 16 parts of C.4'-aminophenylanthraquinone-1(Se).2(N)-selenazole (prepared by heating 1-seleno-2-aminoanthraquinone in the form of its sodium salt with para-nitrobenzoyl chloride in 1-chlornaphthalene and reducing the resulting C.4'-nitrophenylanthraquinone-1(Se).2(N)-selenazole with alkaline sodium hydrosulphite solution), 13 parts of 1-aminoanthraquinone-2-carboxylic acid chloride and 160 parts of nitrobenzene is heated to boiling while stirring until hydrogen chloride no longer escapes. After cooling, the dyestuff is filtered off, washed with nitrobenzene and alcohol and dried. It is a yellow-red powder having the following composition:

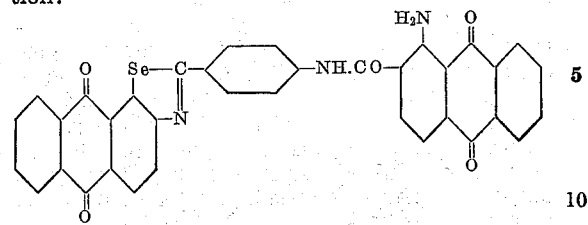

It dyes vegetable fibres red-brown shades from a brown-red vat.

Example 7

A mixture of 10 parts of C.4'-aminophenylanthraquinone-1.2-imidazole (obtainable by the reduction of C.4'-nitrophenylanthraquinone-1.2-imidazole which is obtainable from 1.2-diaminoanthraquinone by boiling with para-nitrobenzoyl chloride in nitrobenzene), 9 parts of anthraquinone-2-carboxylic acid chloride and 200 parts of nitrobenzene is heated to boiling for about an hour while stirring. After cooling to from about 150° to 160° C., the dyestuff is filtered off by suction and washed with nitrobenzene and methanol. It is a yellow crystal powder which does not melt even at 360° C. and which has the following composition:

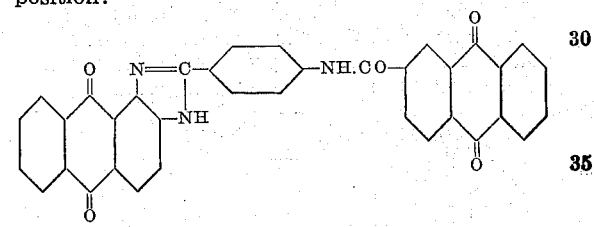

and which dyes cotton fast yellow shades from a brown vat.

If the acid chlorides already hereinbefore described be used instead of anthraquinone-2-carboxylic acid chloride, fast vat dyestuffs are also obtained.

Instead of the 1.2-imidazole, the 2.3-imidazole may also be used. The hydrogen atom of the imidazole ring may be replaced by an alkyl group by treatment with alkylating agents.

If C.4'-aminophenyl-4-aminoanthraquinone-1.2-imidazole (obtainable from 1.2.4-triaminoanthraquinone by boiling with paranitrobenzoyl chloride in 1-chlornaphthalene and reduction of the resulting C.4'-nitrophenyl-4-aminoanthraquinone-1.2-imidazole) be used instead of C.4'-aminophenylanthraquinone-1.2-imidazole, valuable vat dyestuffs are also obtained.

Example 8

A mixture of 17 parts of C.4'-aminophenylanthraquinone-1(N).2-oxazole, 10 parts of benzoyl chloride and 170 parts of nitrobenzene is heated to boiling while stirring until hydrogen chloride no longer escapes. The whole is allowed to cool, filtered off by suction and the residue washed with nitrobenzene and methanol. The C.4'-benzoylaminophenylanthraquinone - 1(N).2-oxazole thus obtained is a yellow crystal powder which dyes cotton yellowish shades from a red vat.

If C.4'-chlor- or C.4'-aminophenylanthraquinone-1(N).2-oxazole be reacted with benzamide, the same dyestuff is obtained.

Instead of benzoyl chloride there may also be used methyl-, halogen-, nitro- and cyanobenzoyl chlorides of also diphenyl monocarboxylic acid chloride, benzophenone carboxylic acid chloride or quinoline-6-carboxylic acid chloride. Fast vat dyestuffs are also obtained in these cases.

If C.2'.4'-diaminophenyleneanthraquinone-1-(N).2-oxazole (obtainable from 1-amino-2-hydroxyanthraquinone by boiling with 2.4-dinitrobenzoyl chloride in 1-chlornaphthalene and reduction of the resulting C.2'.3'-dinitrophenyleneanthraquinone-1(N).2-oxazole with alkaline sodium hydrosulphite solution) be used instead of C.4'-aminophenylanthraquinone-1(N).2-oxazole, both amino groups of the phenyl radicle may be converted into acylamino groups.

*Example 9*

A mixture of 18 parts of C.4'-chlorphenylanthraquinone-1(N).2-oxazole (obtained from 1-amino-2-hydroxyanthraquinone by boiling with para-chlorbenzoyl chloride in nitrobenzene), 11.3 parts of 1-aminoanthraquinone, 8 parts of dehydrated sodium acetate, 1 part of copper acetate and 250 parts of nitrobenzene is heated to boiling in a stirring vessel until initial material is no longer present. After cooling, the whole is filtered off by suction and the resulting dyestuff is washed with nitrobenzene, alcohol and water and dried. It is a brown crystal powder which does not melt even at 360° C. and which dissolves in concentrated sulphuric acid giving a green-yellow coloration which changes to blue-green upon the addition of formaldehyde. It dyes vegetable fibres very fast brown-red shades from a red vat and has the following composition:

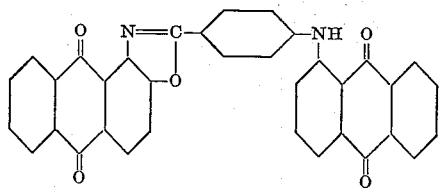

A similar dyestuff is obtained by reacting C.4'-aminophenylanthraquinone-1(N).2-oxazole with 1-chloranthraquinone.

If C.4'-chlorphenylanthraquinone-1.2-imidazole, -1(S).2(N)-thiazole or -1(Se).2(N)-selenazole be used instead of C.4'-chlorphenylanthraquinone-1(N).2-oxazole, fast vat dyestuffs are also obtained.

*Example 10*

A mixture of 18 parts of C.4'-chlorphenylanthraquinone-1(N).2-oxazole, 17.2 parts of 1-amino-5-benzoylaminoanthraquinone, 8 parts of anhydrous sodium acetate, 1 part of copper acetate and 250 parts of nitrobenzene is heated in a stirring vessel as described in Example 9 and worked up in the manner described therein. A red-brown dyestuff is obtained which dissolves in concentrated sulphuric acid giving a yellow coloration which changes to green upon the addition of formaldehyde. It dyes cotton red-brown shades of very good fastness properties from a red vat.

If 1-amino-4-benzoylaminoanthraquinone be used instead of 1-amino-5-benzoylaminoanthraquinone, an olive dyestuff is obtained which dyes vegetable fibres olive shades of good fastness from a red vat.

If 5-amino-1.9-anthrapyrimidine be used instead of 1-amino-5-benzoylaminoanthraquinone, a violet-tinged brown dyestuff is obtained which dyes cotton chocolate-brown shades from a red vat.

For the preparation of this dyestuff, C.4'-aminophenylanthraquinone-1(N).2-oxazole may be used instead of the C.4'-chlorphenyl compound, the said initial material being reacted with the corresponding halogen compound.

Instead of the anthraquinone derivatives there may also be employed the amino or halogen derivatives of cyclic compounds of higher molecular weight, such as of anthanthrone, dibenzpyrenequinone, dibenzanthrone or pyrazolanthrone. In this way fast vat dyestuffs are also obtained.

*Example 11*

A mixture of 18.5 parts of C.3'-nitrophenylanthraquinone-1(N).2-oxazole, 11.2 parts of 1-aminoanthraquinone, 8 parts of sodium acetate, 1 part of copper acetate and 200 parts of nitrobenzene is heated to boiling while stirring for about 20 hours. The whole is then allowed to cool to about 80° C. and the resulting dyestuff is filtered off by suction, washed with nitrobenzene, methanol and water and dried. A grey-brown powder is thus obtained which dissolves in concentrated sulphuric acid giving a yellow coloration and which dyes cotton yellow-olive shades from a red vat.

If 1-amino-5-benzoylaminoanthraquinone be used instead of 1-aminoanthraquinone, a brown dyestuff is obtained which dyes cotton olive shades from a red vat.

When the oxazoles obtainable by causing 1-amino-2-hydroxyanthraquinone or 2-amino-3-hydroxyanthraquinone to react with nitrodiphenyl carboxylic acid chlorides, 5-chlorquinoline-8-carboxylic acid chloride, nitro- or halogenmethylbenzoyl chlorides or nitro- or halogennaphthoyl chlorides are used instead of C.3'-nitrophenylanthraquinone-1(N).2-oxazole, very fast vat dyestuffs are also obtained.

*Example 12*

A mixture of 20 parts of C.2'.4'-dichlorphenylanthraquinone-1(N).2-oxazole (obtainable from 1-amino-2-hydroxyanthraquinone by heating with 2.4-dichlorbenzoyl chloride in nitrobenzene), 17.5 parts of 1-amino-5-benzoylaminoanthraquinone, 8 parts of sodium acetate, 1 part of copper acetate and 250 parts of nitrobenzene is heated to boiling for about 15 hours while stirring. The whole is filtered by suction while hot and the residue is washed with nitrobenzene, methanol and water and dried. A dark brown crystal powder is thus obtained which dissolves in concentrated sulphuric acid giving a yellow coloration and which dyes cotton brown shades from a red vat.

If, instead of C.2'.4'-dichlorphenylanthraquinone-1(N)-2-oxazole, the corresponding 3'.4'-dichloro derivative be used, a dyestuff is obtained which dyes cotton brown-red shades. By using the 2'.5'-dichloro derivative, a dyestuff is obtained which dyes cotton currant-brown shades.

If the 1-amino-5-benzoylaminoanthraquinone be replaced by 1-aminoanthraquinone, more reddish dyestuffs are obtained. If it be replaced by 1-amino-4-benzoylaminoanthraquinone, grey to olive dyestuffs are obtained.

*Example 13*

A mixture of 13 parts of 1-amino-2-hydroxyanthraquinone, 20 parts of 4'-(1-anthraquinonylamino)-benzoyl chloride (obtainable by the reaction of para-aminobenzoic acid with 1-chloranthraquinone and treatment of the resulting 4'-(1-anthraquinonylamino)-benzoic acid with thionyl chloride), 0.4 part of paratoluenesulphonic acid and 300 parts of nitrobenzene is heated to boiling for about 2 hours. After cooling, the whole is filtered by suction and the residue washed with nitrobenzene and alcohol. The dyestuff obtained is a red-brown powder which dissolves in concentrated sulphuric acid giving a yellow-green coloration and which dyes vegetable fibres brown-red shades from a red vat. It agrees with the dyestuff obtainable according to Example 9.

If 4'-(1-anthraquinonylamino)-benzoyl chloride be allowed to act on 2-hydroxy-3-aminoanthraquinone, the corresponding 2.3-anthraquinoneoxazole is obtained; by the action on ortho-mercapto- or ortho-selenoaminoanthraquinones, the corresponding anthraquinonethiazole or anthraquinoneselenazole derivatives are formed.

*Example 14*

A mixture of 12 parts of 1-amino-2-hydroxyanthraquinone, 20 parts of 4'-(anthraquinone-2-carbamido)-benzoyl chloride (obtainable from para-aminobenzoic acid by acylation with anthraquinone-2-carboxylic acid chloride and conversion of the resulting 4'-(anthraquinone-2-carbamido)-benzoic acid into the acid chloride by means of thionyl chloride), 0.5 part of paratoluenesulphonic acid and 250 parts of nitrobenzene is heated to boiling for about 2 hours while stirring. After cooling to from 90° to 100° C., the dyestuff is filtered off by suction and washed with nitrobenzene and methanol. It is a yellow crystal powder and agrees with the dyestuff obtainable according to Example 1.

The anthraquinonethiazole or anthraquinoneselenazole dyestuffs are obtained in the same way by causing 4'-(anthraquinone-2 - carbamido)-benzoyl chloride to act on 1-mercapto-2-aminoanthraquinone or 1-seleno-2-aminoanthraquinone. The corresponding oxazole dyestuffs can also be obtained by causing the above-mentioned acid chloride to act on ortho-halogenaminoanthraquinones. If the said ortho-aminohydroxyanthraquinones or ortho-aminohalogenanthraquinones contain further radicals (as for example 1.5-diamino - 2 - hydroxyanthraquinone, 1.4-dihydroxy-2-aminoanthraquinone or 1.2.5-triaminoanthraquinone), the corresponding oxazole dyestuffs are obtained.

*Example 15*

A mixture of 24 parts of 1-amino-2-hydroxyanthraquinone, 22.5 parts of 1-aminoanthraquinone, 21 parts of isophthalyl chloride, 2 parts of para-toluenesulphonic acid and 400 parts of nitrobenzene is heated to boiling for about 2 hours while stirring. The whole is allowed to cool to from about 60° to 70° C. and the yellow crystal pulp is filtered off by suction and washed with nitrobenzene and methanol. The resulting dyestuff is a yellow powder and probably has the following composition:

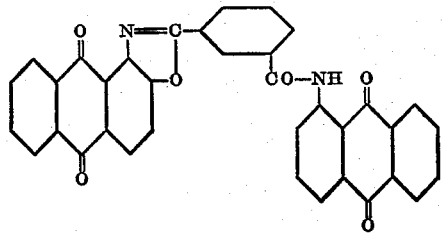

It dyes cotton greenish yellow shades from a violet-tinged red vat.

It may also be prepared by first causing 1 molecular proportion of 1-amino-2-hydroxyanthraquinone to react with 1 molecular proportion of isophthalyl chloride so that one acid chloride group of the isophthalyl chloride is still free, and then treating this acid chloride with 1-aminoanthraquinone, or by causing the C-phenylanthraquinone-1(N).2-oxazole-3'-carboxylic acid (obtainable from 6.3'-methylphenylanthraquinone-1(N).2-oxazole by oxidation with sodium bichromate and sulphuric acid) to react in the form of its acid chloride with 1-aminoanthraquinone.

*Example 16*

A mixture of 18 parts of C.4'-chlorphenylanthraquinone-2.3-oxazole (obtainable by heating 2-amino-3-hydroxyanthraquinone with para-chlorbenzoyl chloride in nitrobenzene), 17 parts of 1 - amino - 4 - benzoylaminoanthraquinone, 8 parts of sodium acetate, 1 part of copper acetate and 250 parts of nitrobenzene is heated to boiling, while stirring, until the formation of the dyestuff is completed. After cooling, the dyestuff is filtered off by suction and the residue washed with nitrobenzene, methanol and water; it is a dark-green powder which is soluble in sulphuric acid giving a green-yellow coloration. It dyes cotton fast olive-green shades from a green-brown vat.

If instead of 1-amino-4-benzoylaminoanthraquinone 1-aminoanthraquinone or 1-amino-5-benzoylaminoanthraquinone is employed, there is obtained a dyestuff giving a brown-red or brown coloration, respectively.

C.3'- chlorphenylanthraquinone - 2.3 - oxazole may also be employed instead of C.4'-chlorphenylanthraquinone-2.3-oxazole in which case the shade of color of the resulting dyestuff is rather different from that obtained when using C.4'-chlorphenylanthraquinone-2.3-oxazole.

What I claim is:
The vat dyestuff of the formula

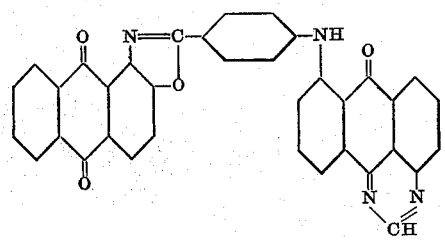

OTTO SCHLICHTING.